(No Model.)

D. M. BOURNE.
CULTIVATOR.

No. 354,381. Patented Dec. 14, 1886.

WITNESSES:
Chas Nida
C. Sedgwick

INVENTOR:
D. M. Bourne
BY Munn & Co
ATTORNEYS.

UNITED STATES PATENT OFFICE.

DANIEL M. BOURNE, OF COOL, KANSAS.

CULTIVATOR.

SPECIFICATION forming part of Letters Patent No. 354,381, dated December 14, 1886.

Application filed July 31, 1886. Serial No. 209,690. (No model.)

*To all whom it may concern:*

Be it known that I, DANIEL M. BOURNE, of Cool, in the county of Cloud and State of Kansas, have invented a new and Improved Cultivator, of which the following is a full, clear, and exact description.

When corn or other grain is planted by the so-called "combined lister and drill," the listing forms a ditch or furrow from six to eight inches deep in which the seed is deposited. The great drawback to this listing is due to the fact that close to the edges of the furrow on each side a row of weeds springs up, which, with ordinary cultivators, it is impossible to exterminate and at the same time cultivate the soil at the bottom of the "list" or furrow.

The object of my invention, therefore, is to provide a shovel that will cultivate the bottom of the furrow and at the same time trim the edges of the furrow; and to this end my invention consists of a cultivator plow, point, or shovel provided with or combined with a cutter extending obliquely upward and standing above the plow proper, whereby while the point enters the furrow the cutter will trim the side of the furrow above the point.

Reference is to be had to the accompanying drawings, forming a part of this specification, in which similar letters of reference indicate corresponding parts in all the figures.

Figure 1:
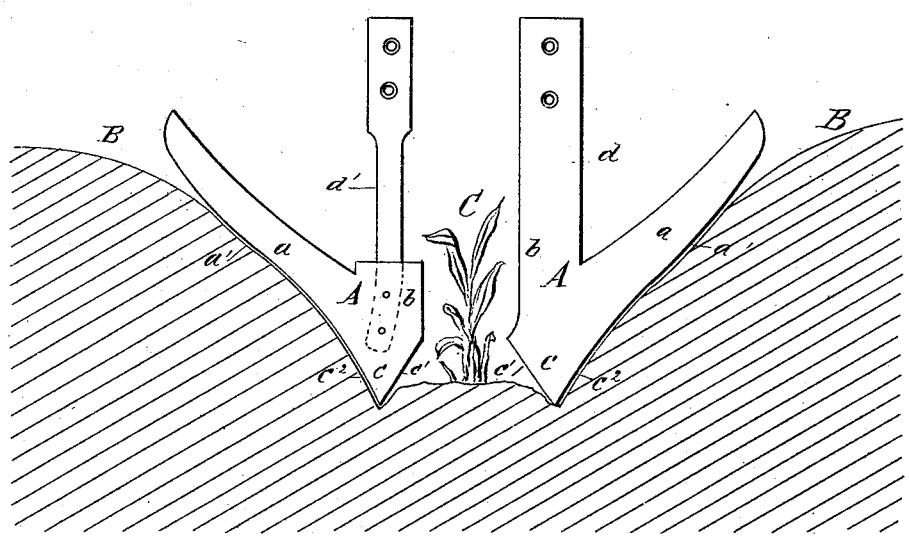
Figure 2:
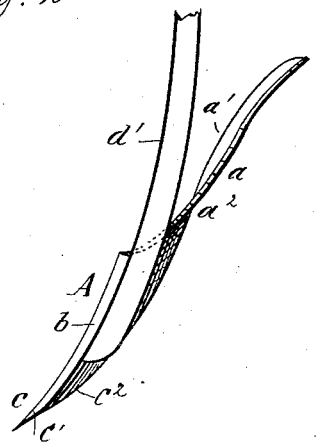
Figure 3:
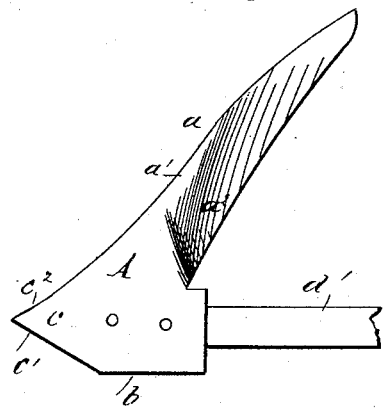

Figure 1 illustrates two shapes of my new plow point and cutter, and also its use, the points being shown in a furrow upon either side of a list of plants. Fig. 2 is an edge view of one point and cutter, and Fig. 3 is a plan view thereof.

The purpose of my new cultivator plow and cutter A is to run the wing $a$ next to the bank B of the furrow, the straight side $b$ next to the corn C, and the point $c$ at the bottom of the furrow to stir the soil at the roots of the corn, and the plow point or shovel may be used as the inside shovel, and can be attached to either a riding or walking cultivator, and has nothing to do with any outside shovels, as the operator can use any kind he desires, or can take them entirely off.

The point $c$ may be rounded or beveled at $c'$ $c^2$ to bring it to a sharp point, and the plow may be made with the shank $d$, or bolted to a separate shank, $d'$, and is held by the shank as nearly perpendicular as possible. The wing or cutter $a$ extends obliquely upward from the main shovel-point $c$, preferably following the curve or bevel $c^2$ in a line of beauty at its outer or cutting edge, $a'$, and the wing or cutter is slightly twisted, as shown at $a^2$, to clear itself of trash, and its upper end stands slightly in rear of the body of the shovel or point $c$, so that the contact of the cutter with the side of the furrow will cause a slight downdraft and cause the shovel to penetrate the soil and tend to steady the cultivator.

With the shovel and cutter constructed in this manner the sides of the furrow may be effectually cleared of weeds, while the bottom of the furrow next to the roots of the corn is at the same time thoroughly stirred and cultivated.

Having thus described my invention, what I claim as new, and desire to secure by Letters Patent, is—

As an improved article of manufacture, the cultivator-plow point A, having the point $c$, the straight edge $b$, and the wing $a$, extending obliquely upward from the point, as set forth.

DANIEL M. BOURNE.

Witnesses:
W. H. CLENDENEN,
G. M. BILLINGS.